United States Patent
Shin et al.

(10) Patent No.: US 11,320,943 B2
(45) Date of Patent: May 3, 2022

(54) TOUCH SENSOR STACK STRUCTURE AND METHOD OF MANUFACTURING THE SAME

(71) Applicant: DONGWOO FINE-CHEM CO., LTD., Jeollabuk-do (KR)

(72) Inventors: Hyun Min Shin, Gyeonggi-do (KR); Heon Kim, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 17/195,886

(22) Filed: Mar. 9, 2021

(65) Prior Publication Data

US 2021/0286466 A1 Sep. 16, 2021

(30) Foreign Application Priority Data

Mar. 16, 2020 (KR) .......................... 10-2020-0031938

(51) Int. Cl.
*G06F 3/044* (2006.01)
*G06F 3/041* (2006.01)

(52) U.S. Cl.
CPC .......... *G06F 3/0443* (2019.05); *G06F 3/0412* (2013.01); *G06F 2203/04103* (2013.01)

(58) Field of Classification Search
CPC ............................. G06F 3/0412; G06F 3/0443

USPC .................................................. 345/173, 174
See application file for complete search history.

(56) References Cited

U.S. PATENT DOCUMENTS

| | | | | |
|---|---|---|---|---|
| 9,348,474 B2 * | 5/2016 | Hong | ..................... | G06F 3/0443 |
| 10,761,660 B2 * | 9/2020 | Lee | ....................... | G06F 3/0412 |
| 2017/0199609 A1 * | 7/2017 | Lee | ....................... | G06F 3/04164 |
| 2020/0285337 A1 * | 9/2020 | Lee | ....................... | G06F 3/0412 |
| 2021/0005704 A1 * | 1/2021 | Jeon | ..................... | H01L 27/3265 |

FOREIGN PATENT DOCUMENTS

KR 10-2078385 B1 2/2020

* cited by examiner

*Primary Examiner* — Calvin C Ma
(74) *Attorney, Agent, or Firm* — The PL Law Group, PLLC (57) ABSTRACT

A touch sensor stack structure according to an exemplary embodiment of the present invention includes a touch sensor structure including a bonding portion, a circuit connection structure bonded to the bonding portion of the touch sensor structure, and an optical film stacked on the touch sensor structure. The optical film includes a protrusion covering an end portion of the circuit connection structure and overlapping the bonding portion. Damages of electrodes included in the touch sensor structure can be prevented by the optical film.

17 Claims, 7 Drawing Sheets

TOUCH SENSOR STACK STRUCTURE AND METHOD OF MANUFACTURING THE SAME

CROSS-REFERENCE TO RELATED APPLICATION AND CLAIM OF PRIORITY

This application claims priority to Korean Patent Applications No. 10-2020-0031938 filed on Mar. 16, 2020 in the Korean Intellectual Property Office (KIPO), the entire disclosure of which is incorporated by reference herein.

BACKGROUND

1. Technical Field

The present invention relates to a touch sensor stack structure and a method of manufacturing the same. More particularly, the present invention relates to a touch sensor stack structure including a touch sensor layer and an optical layer and a method of manufacturing the same.

2. Background Art

As information technologies are being developed, various demands in display devices having thinner dimension, light-weight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device.

For example, the touch panel may include sensing electrodes and pads applying signals to the sensing electrodes. The pads may be electrically connected to a circuit member that may apply a driving signal. Additionally, an optical film of a display device such as a polarizing plate may be laminated on the touch panel.

Thus, the touch panel, the circuit member and the optical film may be fabricated as one module or a laminate, and precise interlayer alignment, cutting processes, etc., may be required. Additionally, electrodes included in the touch panel may be damaged by a lamination process or bending of the laminate.

For example, as disclosed in Korean Registered Patent Publication No. 10-2078385, various image display devices combined with a touch screen panel has been developed recently. However, a process construction from an aspect of the optical film lamination, the circuit member bonding, etc., is not suggested.

SUMMARY

According to an aspect of the present invention, there is provided a touch sensor stack structure having improved mechanical stability and reliability.

According to an aspect of the present invention, there is provided a method of manufacturing a touch sensor stack structure having improved mechanical stability and reliability.

The above aspects of the present inventive concepts will be achieved by the following features or constructions:

(1) A touch sensor stack structure, including: a touch sensor structure having a bonding portion; a circuit connection structure having an end portion bonded to the bonding portion of the touch sensor structure; and an optical film stacked on the touch sensor structure, the optical film including a protrusion covering the end portion of the circuit connection structure and overlapping the bonding portion.

(2) The touch sensor stack structure according to the above (1), wherein the protrusion of the optical film includes a wing portion protruding from a lateral side of the bonding portion in a planar view.

(3) The touch sensor stack structure according to the above (1), wherein a width of the wing portion is from 0.1 µm to about 50 µm.

(4) The touch sensor stack structure according to the above (1), wherein the touch sensor structure includes: a substrate layer; sensing electrodes arranged on the substrate layer; and pad portions included in the bonding portion and electrically connected to the sensing electrodes.

(5) The touch sensor stack structure according to the above (4), wherein the circuit connection structure is electrically connected to the pad portions, and the circuit connection structure includes a flexible printed circuit board.

(6) The touch sensor stack structure according to the above (1), wherein the optical film includes a polarizing plate.

(7) The touch sensor stack structure according to the above (1), wherein the bonding portion protrudes from one side of the touch sensor structure, and the protrusion of the optical film extends from one side of the optical film, and the protrusion of the optical film has a width greater than a width of the bonding portion of the touch sensor structure.

(8) A window stack structure, including: the touch sensor stack structure according to embodiments as described above; and a window substrate disposed on the touch sensor stack structure.

(9) The window stack structure according to the above (8), wherein the optical film of the touch sensor stack structure includes a polarizing plate, and the optical film is disposed between the window substrate and the touch sensor structure.

(10) An image display device, including: a display panel; and the touch sensor stack structure according to embodiments as described above stacked on the display panel.

(11) A method of manufacturing a touch sensor stack structure, including: preparing a touch sensor structure; partially removing an end portion of the touch sensor structure by a first cutting process to form a bonding portion; bonding a circuit connection structure on an end portion of the bonding portion; forming an optical film on the touch sensor structure to cover the end portion of the circuit connection structure; and cutting portions of the touch sensor structure and the optical film around the bonding portion by a second cutting process.

(12) The method according to the above (11), wherein the first cutting process includes forming an alignment key at a corner portion of the touch sensor structure.

(13) The method according to the above (12), wherein the second cutting process includes aligning a cutting tool with reference to the alignment key.

(14) The method according to the above (12), wherein the second cutting process includes cutting the corner portion at which the alignment key is formed.

(15) The method according to the above (11), wherein the end portion of the touch sensor structure includes a bonding area and margin areas adjacent to both sides of the bonding area, and the first cutting process includes cutting the margin areas.

According to embodiments of the present invention, a first cutting process for cutting a peripheral portion around a bonding area of a touch sensor structure may be performed, and then a circuit connection structure may be bonded. Thereafter, an optical film such as a polarizing plate may be laminated, and peripheral portions of the touch sensor structure and the optical film around the bonding area may be cut by a second cutting process. Electrode cracks occurring at an edge portion of a touch sensor layer may be prevented and a cutting stress may be distributed by the sequentially repeated cutting processes.

In some embodiments, an alignment key may be formed together on the touch sensor layer while performing the first cutting process. Precision and reliability of the second cutting process may be improved using the alignment key.

In some embodiments, a cut portion of the optical film by the second cutting process may include a step portion or a wing portion protruding from a cut portion of the touch sensor layer. The wing portion may serve as an electrode protection pattern of the touch sensor layer, so that electrode crack and electrode corrosion at an edge portion of the touch sensor structure may be prevented. Further, a bending stress in the bonding area may be reduced by the wing portion.

DETAILED DESCRIPTION

According to exemplary embodiments of the present invention, there is provided a touch sensor stack structure including an optical film and a circuit connection structure. According to exemplary embodiments of the present invention, there is also provided a method of manufacturing a touch sensor structure including a laminating process and a cutting process of an optical film.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

FIGS. 1 to 5 are schematic top planar views illustrating a method of manufacturing a touch sensor stack structure in accordance with exemplary embodiments.

Figure 1:
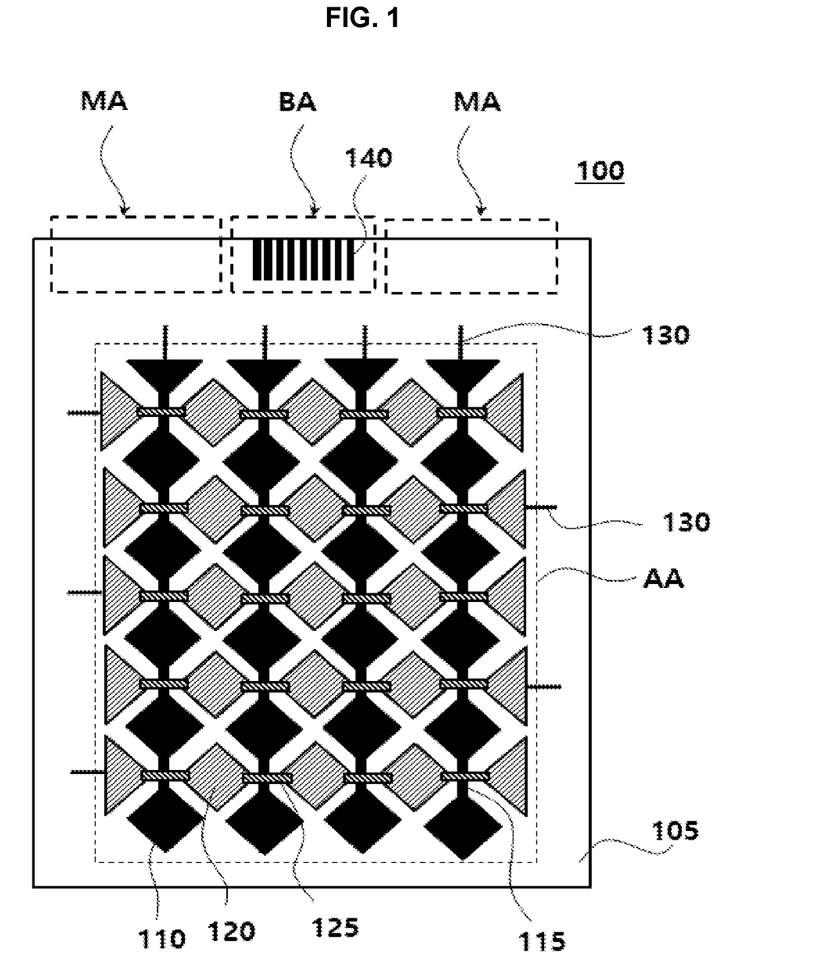
FIGS. 1 to 5 are schematic top planar views illustrating a method of manufacturing a touch sensor stack structure in accordance with exemplary embodiments.

Referring to FIG. 1, a touch sensor structure 100 may be prepared. The touch sensor structure 100 may include sensing electrodes 110 and 120 arranged on a substrate layer 105.

The substrate layer 105 may include a flexible and transparent insulating material. For example, the substrate layer 105 may include a resin material such as cyclo olefin polymer (COP), polyethylene terephthalate (PET), polyacrylate (PAR), polyether imide (PEI), polyethylene naphthalate (PEN), polyphenylene sulfide (PPS), polyallylate, polyimide (PI), cellulose acetate propionate (CAP), polyether sulfone (PES), cellulose triacetate (TAC), polycarbonate (PC), cyclo olefin copolymer (COC), polymethylmethacrylate (PMMA), etc. The substrate layer 105 may include an inorganic insulation material such as glass, silicon oxide, etc.

The substrate layer 105 may include an active area AA, a bonding area BA and a margin area MA. The active area AA may include a central portion of the substrate layer 105 and may be an area from which a user's touch may be substantially recognized and a signal may be generated.

For example, when the user's touch is input onto the active area AA, a change in capacitance may occur due to the sensing electrodes 110 and 120. Accordingly, a physical touch may be converted into an electrical signal to implement a touch sensing.

The sensing electrodes 110 and 120 may include first sensing electrodes 110 and second sensing electrodes 120.

The first sensing electrodes 110 may be arranged along, e.g., a length direction or a column direction of the substrate layer 105 or the touch sensor stack structure. Accordingly, a first sensing electrode row may be formed by a plurality of the first sensing electrodes 110. Additionally, a plurality of the first sensing electrode columns may be arranged in a width direction or a row direction.

In some embodiments, the first sensing electrodes 110 neighboring in the column direction may be physically or electrically connected to each other by a connection portion 115. For example, the connection portion 115 may be integrally formed with the first sensing electrodes 110 at the same level.

The second sensing electrodes 120 may be arranged along the row direction or the width direction. In some embodiments, the second sensing electrodes 120 may be physically spaced apart from each other as island-type unit electrodes. In this case, the second sensing electrodes 120 neighboring in the row direction may be electrically connected to each other by a bridge electrode 125.

A plurality of the second sensing electrodes 120 may be connected to each other by the bridge electrodes 125 in the first direction, such that a second sensing electrode row may be formed. A plurality of the second sensing electrode rows may be arranged along the column direction or the length direction.

The sensing electrodes 110 and 120 and the bridge electrode 125 may each include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca) or an alloy containing at least one of the metals (e.g., silver-palladium-copper (APC), copper-calcium (CuCa)). These may be used alone or in combination thereof. For example, the sensing electrodes 110 and 120 may have a mesh structure including the metal or alloy.

The sensing electrodes 110 and 120 and the bridge electrode 125 may each include a transparent conductive material. For example, sensing electrodes 110 and 120 and the bridge electrode 125 may include a transparent conductive oxide such as indium tin oxide (ITO), indium zinc oxide (IZO), zinc oxide (ZnO), indium zinc tin oxide (IZTO) and cadmium tin oxide (CTO), silver nanowire (AgNW), carbon nanotube (CNT), graphene, a conductive polymer, etc.

In some embodiments, the sensing electrodes 110 and 120 may include a stacked structure of a transparent conductive oxide layer and a metal layer. For example, the sensing electrodes 110 and 120 may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

In some embodiments, the bridge electrode 125 may be formed on an insulating layer (not illustrated). The insulating layer may at least partially cover the connection portion 115 included in the first sensing electrode 110 and may at least partially cover the second sensing electrodes 120 around the connection portion 115. The bridge electrode 125 may be formed through the insulating layer and may be electrically connected to the second sensing electrodes 120 adjacent to each other with the connection portion 115 interposed therebetween.

The insulating layer may include an inorganic insulating material such as silicon oxide or silicon nitride, or an organic insulating material such as an acrylic resin or a siloxane resin.

A trace 130 may branch and extend from each of the first sensing electrode columns and the second sensing electrode rows. The traces 130 may branch from end portions of each of the first sensing electrode column and the second sensing electrode row, and may extend on a peripheral area around the active region AA.

The traces 130 may extend toward the bonding area BA allocated to a portion of one end of the touch sensor structure 100 in the length direction. Terminal ends of the traces 130 may be collected on the bonding area BA of the substrate layer 105. Pad portions 140 may be formed on the bonding area BA, and may each be connected to the traces 130. In an embodiment, the terminal ends of the traces 130 may be provided as the pad portions 140.

For convenience of descriptions, an illustration of a connection structure between the traces 130 and the pad portions 140 is omitted in FIG. 1.

In some embodiments, the touch sensor structure 100 may be formed by a transfer process. For example, a sensing electrode layer including the above-described sensing electrodes 110 and 120, bridge electrodes 125 and traces 130 may be formed on a carrier substrate. Thereafter, the sensing electrode layer may be transferred to the substrate layer 105 and the carrier substrate may be peeled off and removed to obtain the touch sensor structure 100.

In an embodiment, a separation layer including an organic material for promoting a peeling process may be formed between the sensing electrode layer and the carrier substrate. The sensing electrode layer and the substrate layer 105 may be bonded to each other through an adhesive layer.

As illustrated in FIG. 1, the margin area MA may be included at the one end of the substrate layer 105 or the touch sensor structure 100 in the length direction. For example, areas adjacent to both sides of the bonding area BA may be allocated as the margin area MA.

Hereinafter, for convenience of descriptions, an illustration of detailed electrode arrangements included in the touch sensor structure 100 is omitted.

Figure 2:
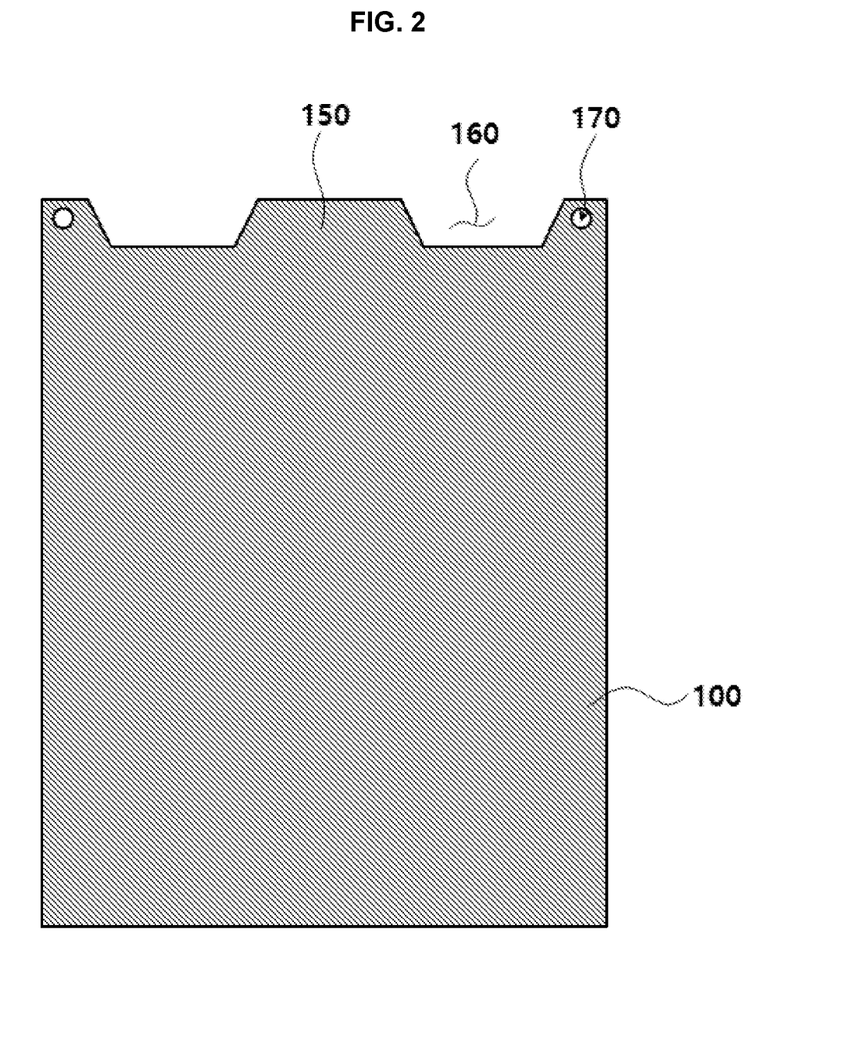

Referring to FIG. 2, a first cutting process may be performed on the touch sensor structure 100.

In exemplary embodiments, the margin area MA of the touch sensor structure 100 illustrated in FIG. 1 may be at least partially removed through the first cutting process. The bonding area BA may at least partially remain by the first cutting process such that a bonding portion 150 may be formed.

The bonding portion 150 may include the pad portions 140 and may serve as a bonding tag for a bonding process with a circuit connection structure as will be described below. For example, as illustrated in FIG. 2, the bonding portion 150 may have a substantially trapezoidal shape in a planar view.

As described above, the margin area MA may be at least partially removed by the first cutting process, so that a recess 160 may be formed at one end of the touch sensor structure 100 or the substrate layer 105. For example, two recesses 160 may be formed with the bonding portion 150 interposed therebetween.

In exemplary embodiments, an alignment key 170 may be formed together with the recesses 160 during the first cutting process. In some embodiments, the alignment key 170 may be formed at a corner portion of the one end of the touch sensor structure 100 or the substrate layer 105.

For example, the alignment key 170 may be formed at both corner portions of an upper portion of the touch sensor structure 100 in FIG. 2. The alignment key 170 may have a hole shape.

Figure 3:
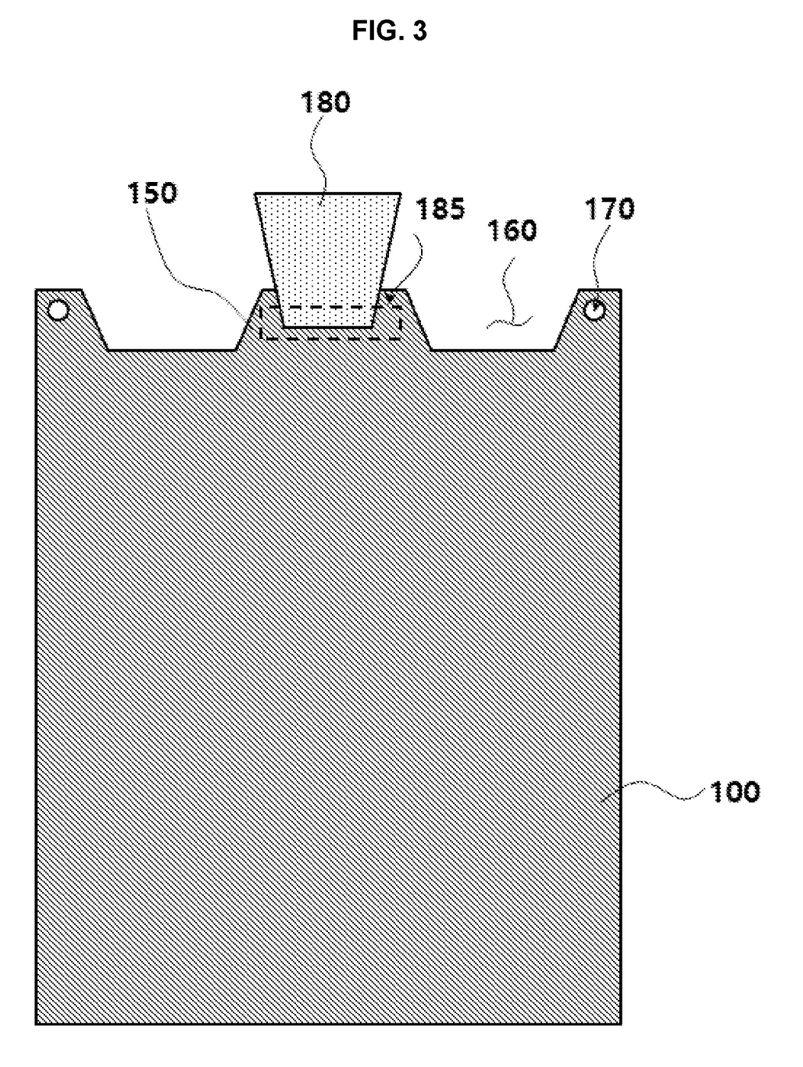

Referring to FIG. 3, a circuit connection structure 180 may be bonded to the bonding portion 150.

In exemplary embodiments, the circuit connection structure 180 may include a flexible printed circuit board (FPCB). For example, the circuit connection structure 180 may include a core layer and a circuit wiring formed on the core layer.

For example, the circuit connection structure 180 may be aligned on the bonding portion 150, and then a thermal-pressing process may be performed using a pressing tool such as a bonding tip such that the circuit wiring of the circuit connection structure 180 and the pad portions 140 included in the bonding portion 150 may be electrically connected to each other.

In some embodiments, a conductive intermediate film 185 may be disposed between the bonding portion 150 and the circuit connection structure 180, and then a bonding process may be performed by compressing the bonding portion 150 and the circuit connection structure 180 to each other. For example, the conductive intermediate film 185 may include an anisotropic conductive film (ACF).

According to the above-described exemplary embodiments, the bonding process may be performed in the state that the recesses 160 are formed in the touch sensor structure 100 by the first cutting process. Accordingly, damages to the traces 130 included in the touch sensor structure 100 caused when a stress by the heat/pressure from the bonding process is transferred to a lateral portion of the substrate layer 105 may be prevented.

Figure 4:
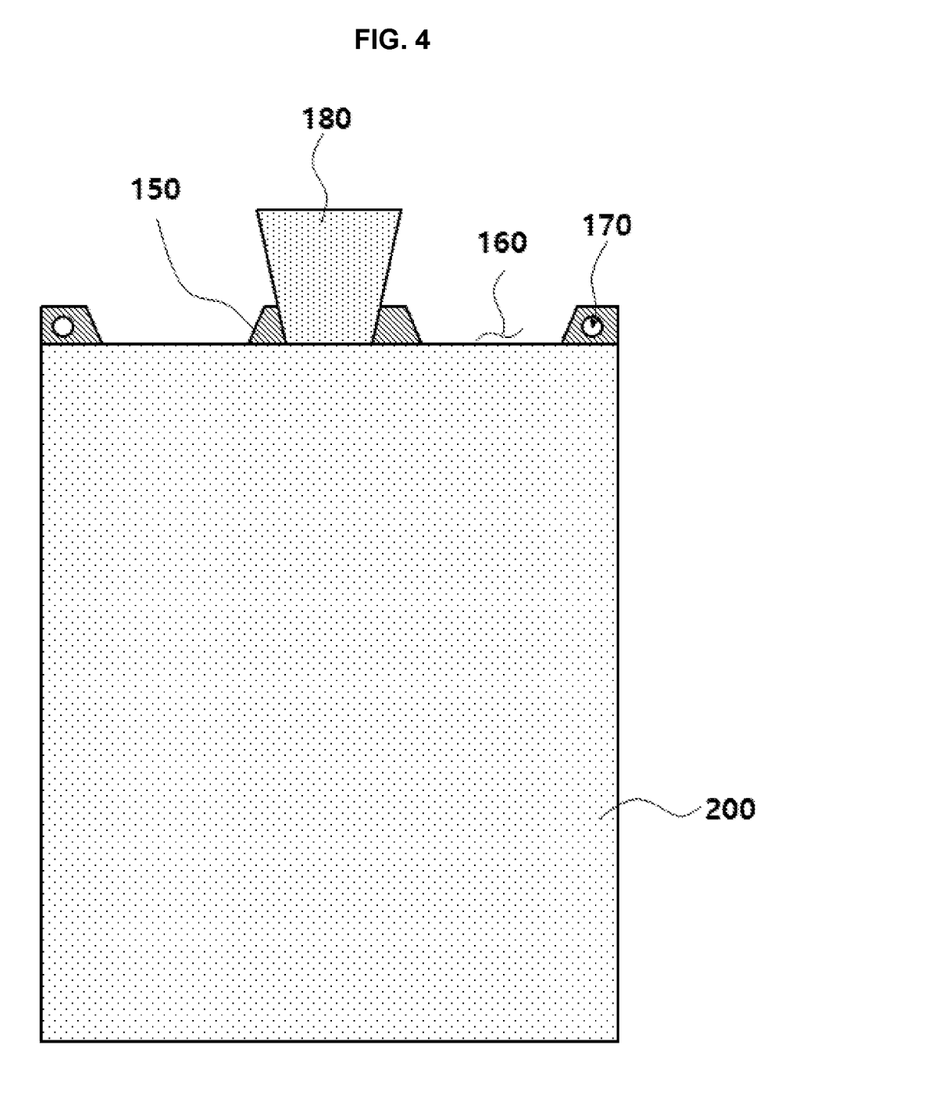

Referring to FIG. 4, an optical film 200 may be laminated on the touch sensor structure 100.

In exemplary embodiments, the optical film 200 may include a film or a layer structure known in the art for improving an image visibility of an image display device. Non-limiting examples of the optical film 200 may include a polarizing plate, a polarizer, a retardation film, a reflective sheet, a luminance-enhancing film, a refractive index matching film. These may be used alone or in a multi-layered structure including two or more therefrom.

In an embodiment, the optical film 200 may be a polarizing plate. In this case, the optical film 200 may include, e.g., a polyvinyl alcohol-based polarizer and a protective film formed on at least one surface of the polarizer. The protective film may include, e.g., a resin material such as triacetyl cellulose (TAC) and cyclic olefin polymer (COP).

In some embodiments, the optical film 200 may partially cover the bonding portion 150 and partially cover an end portion of the circuit connection structure 180. The optical film 200 may partially cover an end portion of the recess 160.

Figure 5:
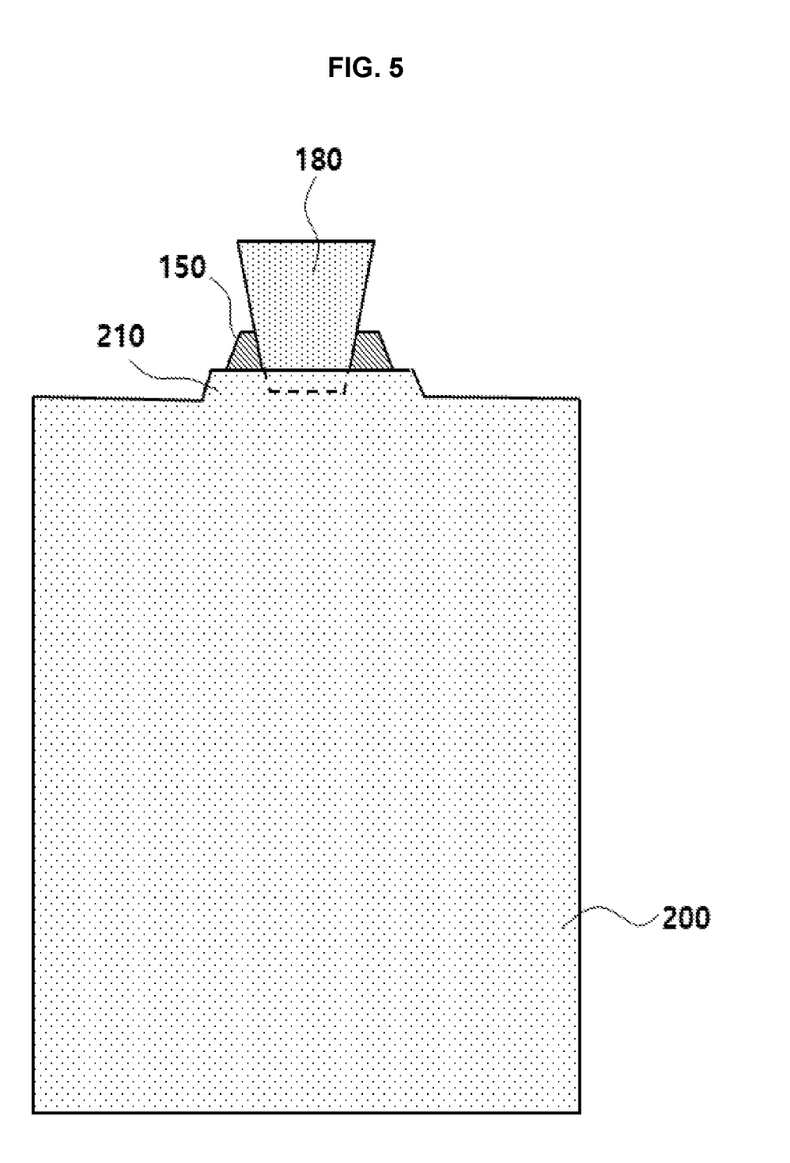

Referring to FIG. 5, the optical film 200 and the touch sensor structure 100 may be cut together by a second cutting process.

In exemplary embodiments, end portions of the touch sensor structure 100 and the optical film 200 adjacent to the circuit connection structure 180 and the bonding portion 150 may be cut and removed by the second cutting process. Accordingly, the touch sensor structure 100 and the optical film 200 may share substantially the same cutting face around the bonding portion 150.

In some embodiments, the second cutting process may be performed using the alignment key 170 formed in the first cutting process. For example, a cutting tool for the second cutting process may be aligned with reference to the alignment key 170. The alignment key 170 may be removed together with the corner portion of the touch sensor structure 100 by the second cutting process.

In some embodiments, both lateral portions of the touch sensor structure 100 and the optical film 200 around the bonding portion 150 may be cut by the second cutting process. Accordingly, the recess 160 included in the touch sensor structure 100 may also be removed by the second cutting process.

In exemplary embodiments, a protrusion 210 may be formed at an end portion of the optical film 200 by the second cutting process. The protrusion 210 may partially overlap the bonding portion 150 and may cover an end portion of the circuit connection structure 180.

The protrusion 210 may be formed from the optical film 200, so that the circuit connection structure 180 may be more stably fixed on the bonding portion 150. For example, the circuit connection structure 180 may be bent downwardly to be connected to a main board of the image display device. In this case, the circuit connection structure 180 may be bent together with the bonding portion 150.

The bonding portion 150 having a reduced width may be formed from the touch sensor structure 100 through the first and second cutting processes as described above, so that the bending may be performed more easily. Further, when the bending is performed using the protrusion 210 of the optical film 200, the circuit connection structure 180 may be prevented from being detached, and cracks and delamination of the pad portion 140 may also be prevented.

Additionally, the pad portions 140 may be covered by the protrusion 210 of the optical film 200, so that corrosion of the pad portions 140 may be substantially suppressed or reduced.

Figure 6:
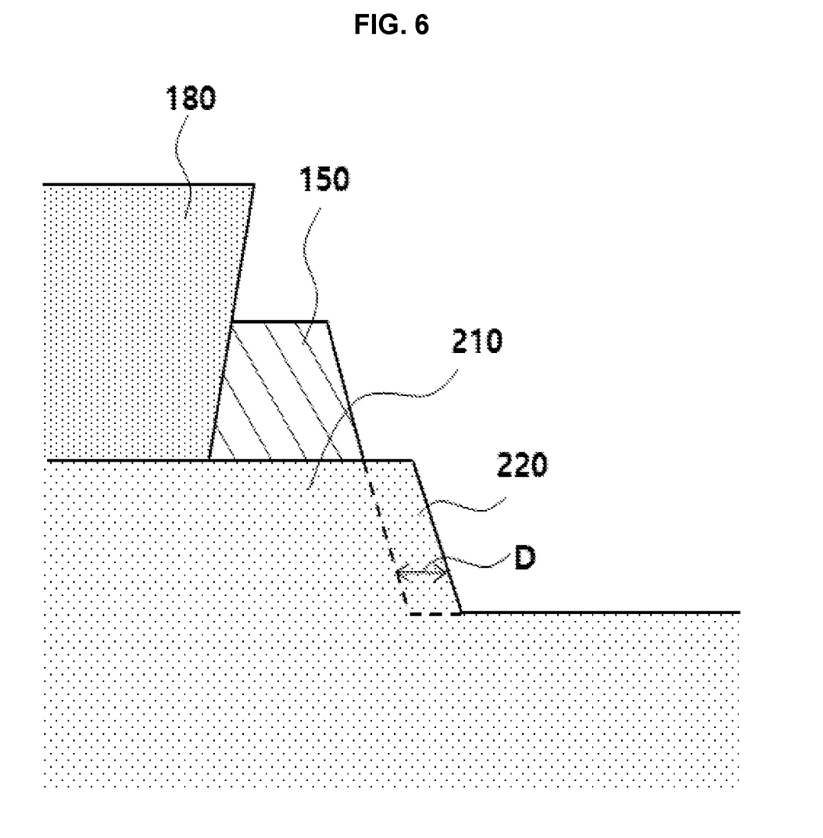
FIG. 6 is a partially enlarged top planar view illustrating a cut portion around a bonding portion of a touch sensor stack structure in accordance with exemplary embodiments.

FIG. 6 is a partially enlarged top planar view illustrating a cut portion around a bonding portion of a touch sensor stack structure in accordance with exemplary embodiments.

Referring to FIG. 6, as described above, the optical film 200 may include the protrusion 210 partially covering the bonding portion 150 and the circuit connection structure 180. In exemplary embodiments, a width of the protrusion 210 may be larger than a width of the bonding portion 150 of the touch sensor structure 100.

Accordingly, the protrusion 210 may include a wing portion 220 protruding in a width direction from a lateral surface of the bonding portion 150. The wing portion 220 may serve as a cover layer protecting the lateral surface of the bonding portion 150 included in the touch sensor structure 100. Thus, the corrosion of the pad portion 140 caused by moisture and air penetrating through the lateral surface of the bonding portion 150 may be additionally prevented.

In an embodiment, the width D of the wing portion 220 may be from about 0.1 μm to about 50 μm. When the width of the wing portion 220 exceeds about 50 μm, a step difference between the touch sensor structure 100 and the optical film 200 may increase excessively to result in a mechanical defect.

Figure 7:
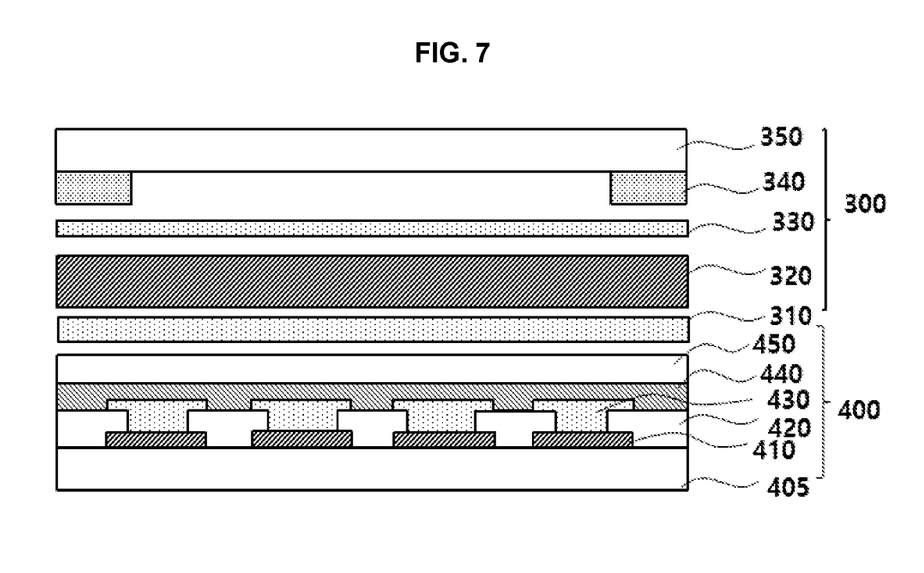
FIG. 7 is a schematic cross-sectional view illustrating a window stack structure and an image display device in accordance with exemplary embodiments.

FIG. 7 is a schematic cross-sectional view illustrating a window stack structure and an image display device in accordance with exemplary embodiments.

Referring to FIG. 7, a window stack structure 300 may include a window substrate 350 and a touch sensor stack structure 320 according to exemplary embodiments as described above.

The window substrate 350 may include, e.g., a hard coating film, a thin glass (e.g., ultra-thin glass (UTG)). In an embodiment, a light-shielding pattern 340 may be formed on a peripheral portion of a surface of the window substrate 340. The light-shielding pattern 340 may include a color-printed pattern, and may have a single-layered or multi-layered structure.

A bezel portion or a non-display region of the image display device may be defined by the light-shielding pattern 340. The light-shielding pattern 340 may serve as a deco-film or a deco-pattern.

The touch sensor stack structure 320 may be combined with the window substrate 350 as a film or a panel. In an embodiment, the touch sensor stack structure 320 may be combined with the window substrate 350 via a first adhesive layer 330.

For example, the window substrate 350, the optical film 200 of touch sensor stack structure 320 and the touch sensor structure 100 of touch sensor stack structure 320 may be sequentially positioned from a viewer's side. In this case, sensing electrodes of the touch sensor structure 200 may be disposed under the optical film including a polarizing layer or a polarizing plate so that electrode patterns may be effectively prevented from being recognized by the viewer.

The image display device may include a display panel 400 and the window stack structure 300 including the touch sensor stack structure 320 according to exemplary embodiments.

The display panel 400 may include a pixel electrode 410, a pixel defining layer 420, a display layer 430, an opposing electrode 440 and an encapsulation layer 450 disposed on a panel substrate 405.

The panel substrate 405 may include a flexible resin material. In this case, the image display device may be provided as a flexible display.

A pixel circuit including a thin film transistor (TFT) may be formed on the panel substrate 405, and an insulation layer covering the pixel circuit may be formed. The pixel electrode 410 may be electrically connected to, e.g., a drain electrode of the TFT on the insulation layer.

The pixel defining layer 420 may be formed on the insulation layer, and the pixel electrode 410 may be exposed through the pixel defining layer 420 such that a pixel region may be defined. The display layer 430 may be formed on the pixel electrode 410, and the display layer 430 may include, e.g., a liquid crystal layer or an organic light emitting layer.

The opposing electrode 440 may be disposed on the pixel defining layer 420 and the display layer 430. The opposing electrode 440 may serve as, e.g., a common electrode or a cathode of the image display device. The encapsulation layer

450 may be disposed on the opposing electrode 440 to protect the display panel 400.

In some embodiments, the display panel 400 and the touch sensor stack structure 320 may be combined with each other through a second adhesive layer 310. For example, a thickness of the second adhesive layer 310 may be greater than a thickness of the first adhesive layer 330. A viscoelasticity of the second adhesive layer 310 may be about 0.2 MPa or less at a temperature ranging from −20° C. to 80° C. In this case, a noise from the display panel 400 may be blocked, and an interface stress while being bent may be alleviated so that damages of the window stack structure 300 may be avoided. In an embodiment, the viscoelasticity of the second adhesive layer 310 may be in a range from about 0.01 MPa to about 0.15 MPa.

What is claimed is:

1. A touch sensor stack structure, comprising:
    a touch sensor structure having a substrate, sensing electrodes arranged on the substrate, and a bonding portion including pad portions electrically connected to the sensing electrodes;
    a circuit connection structure having an end portion bonded to the bonding portion of the touch sensor structure; and
    an optical film stacked on the touch sensor structure, the optical film comprising a protrusion covering the end portion of the circuit connection structure and overlapping the bonding portion,
    wherein a width of the protrusion of the optical film is larger than a width of the bonding portion of the touch sensor structure in a planar view.

2. The touch sensor stack structure according to claim 1, wherein the protrusion of the optical film includes a wing portion protruding from a lateral side of the bonding portion in a planar view.

3. The touch sensor stack structure according to claim 1, wherein a width of the wing portion is from 0.1 μm to about 50 μm.

4. The touch sensor stack structure according to claim 1, wherein the circuit connection structure is electrically connected to the pad portions, and the circuit connection structure includes a flexible printed circuit board.

5. The touch sensor stack structure according to claim 1, wherein the optical film includes a polarizing plate.

6. The touch sensor stack structure according to claim 1, wherein the bonding portion protrudes from one side of the touch sensor structure, and the protrusion of the optical film extends from one side of the optical film; and
    the protrusion of the optical film has a width greater than a width of the bonding portion of the touch sensor structure.

7. A window stack structure, comprising:
    the touch sensor stack structure of claim 1; and
    a window substrate disposed on the touch sensor stack structure.

8. The window stack structure according to claim 7, wherein the optical film of the touch sensor stack structure comprises a polarizing plate; and
    the optical film is disposed between the window substrate and the touch sensor structure.

9. An image display device, comprising:
    a display panel; and
    the touch sensor stack structure of claim 1 stacked on the display panel.

10. A method of manufacturing a touch sensor stack structure, the method comprising:
    preparing a touch sensor structure having a substrate, sensing electrodes arranged on the substrate, and pad portions electrically connected to the sensing electrodes;
    partially removing an end portion of the touch sensor structure by a first cutting process to form a bonding portion including the pad portions;
    bonding a circuit connection structure on an end portion of the bonding portion;
    forming an optical film on the touch sensor structure to cover the end portion of the circuit connection structure; and
    cutting portions of the touch sensor structure and the optical film around the bonding portion by a second cutting process to form a protrusion of the optical film,
    wherein a width of the protrusion of the optical film is larger than a width of the bonding portion of the touch sensor structure in a planar view.

11. The method according to claim 10, wherein the end portion of the touch sensor structure comprises a bonding area and margin areas adjacent to both sides of the bonding area; and
    the first cutting process comprises cutting the margin areas.

12. The method according to claim 10, wherein the first cutting process comprises forming an alignment key at a corner portion of the touch sensor structure.

13. The method according to claim 12, wherein the second cutting process comprises aligning a cutting tool with reference to the alignment key.

14. The method according to claim 12, wherein the second cutting process comprises cutting the corner portion at which the alignment key is formed.

15. A method of manufacturing a touch sensor stack structure, the method comprising:
    preparing a touch sensor structure;
    partially removing an end portion of the touch sensor structure by a first cutting process to form a bonding portion;
    bonding a circuit connection structure on an end portion of the bonding portion;
    forming an optical film on the touch sensor structure to cover the end portion of the circuit connection structure; and
    cutting portions of the touch sensor structure and the optical film around the bonding portion by a second cutting process,
    wherein the first cutting process comprises forming an alignment key at a corner portion of the touch sensor structure.

16. The method according to claim 15, wherein the second cutting process comprises aligning a cutting tool with reference to the alignment key.

17. The method according to claim 15, wherein the second cutting process comprises cutting the corner portion at which the alignment key is formed.

* * * * *